Figure 1:
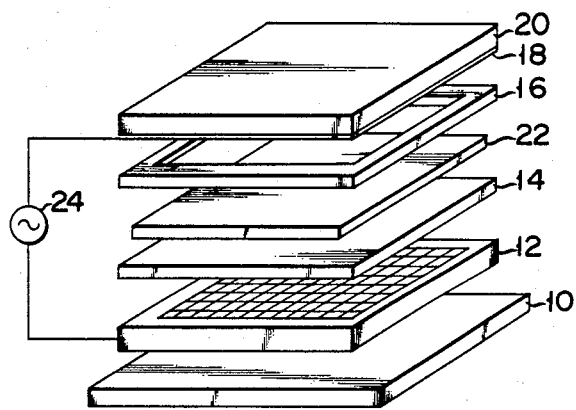

United States Patent [19]

Kobayashi et al.

[11] 4,432,610
[45] Feb. 21, 1984

[54] LIQUID CRYSTAL DISPLAY DEVICE

[75] Inventors: Hiroshi Kobayashi, Tokyo; Hisashi Yamada; Yukimasa Uchida, both of Yokohama, all of Japan

[73] Assignee: Tokyo Shibaura Denki Kabushiki Kaisha, Kawasaki, Japan

[21] Appl. No.: 235,995

[22] Filed: Feb. 19, 1981

[30] Foreign Application Priority Data

| Feb. 22, 1980 | [JP] | Japan | 55-20542 |
| Jul. 11, 1980 | [JP] | Japan | 55-93962 |
| Jul. 11, 1980 | [JP] | Japan | 55-93964 |

[51] Int. Cl.³ .................................. G02F 1/133
[52] U.S. Cl. .................. 350/331 R; 350/333; 350/334; 350/339 R; 340/784
[58] Field of Search .......... 350/330, 331 R, 332, 350/333, 334, 339 R, 338, 342, 346; 340/765, 784

[56] References Cited

U.S. PATENT DOCUMENTS

| 3,824,003 | 7/1974 | Koda et al. | 350/333 |
| 3,910,681 | 10/1975 | Elliott et al. | 350/338 |
| 4,112,333 | 9/1978 | Asars . | |
| 4,223,308 | 9/1980 | Baraff et al. | 350/334 X |
| 4,233,603 | 11/1980 | Castleberry | 340/784 X |
| 4,251,136 | 2/1981 | Miner et al. | 340/784 X |

FOREIGN PATENT DOCUMENTS 2011639  7/1979  United Kingdom .
2016726  9/1979  United Kingdom .

OTHER PUBLICATIONS

Hayama et al., "Amorphous-Silicon Thin-Film Metal-Oxide-Semiconductor Transistors", *Applied Physics Letters*, May 1980, 753–755.

Depp et al., "Liquid Crystal Display Driver Circuit and Polysilicon Components Therefor", *IBM Technical Disclosure Bulletin*, vol. 23, No. 8, Jan. 1981, pp. 3863–3864.

Baraf et al., *The Optimization of Metal-Insulator-Metal Nonliner Devices for Use in Multiplexed Liquid Crystal Displays*, 1980 Biennial Display Research Conference.

Conference Record of 1978 Biennial Display Research Conference, Oct. 24–26, 1978, Cherry Hill, N.J., The Institute of Electrical and Electronics Engineers, Inc., N.Y., D. E. Castleberry, "Varistor Controlled Multiplexed Liquid Crystal Display", pp. 42–43.

W. P. Bleha, "Application of the Liquid Crystal Light Valve to Real-Time Optical Data Processing," Optical Engineering, 7/78.

T. P. Brody, "Large Scale Integration for Display Screens," Proc. SID 17/1, 1st Quarter 1976.

*Primary Examiner*—John K. Corbin
*Assistant Examiner*—David Lewis
*Attorney, Agent, or Firm*—Oblon, Fisher, Spivak, McClelland & Maier

[57] ABSTRACT

A liquid crystal display device is proposed which has a substrate having electrodes corresponding to the display picture elements, liquid crystal arranged on the substrate through a dielectric mirror, and a transparent electrode arranged on liquid crystal and applying electric fields to the liquid crystal for each picture element through the respective electrodes on the substrate. The substrate has memory cells which are capable of storing data and of becoming electrically conductive, this conductive condition being determined and sustained based on the contents of the stored data. The electric fields are applied to the liquid crystal through these memory cells.

19 Claims, 26 Drawing Figures

LIQUID CRYSTAL DISPLAY DEVICE

The present invention relates to a liquid crystal display device for displaying fine picture images such as documents.

A desire has grown to display very fine picture images such as documents in an enlarged form. An electronic rewritable video projector device has been proposed for this purpose. In this device, a reflective type display device called as a light valve formed of, e.g. liquid crystal is attached to the surface of a cathode-ray tube (CRT), and a light source and a beam splitter are interposed between the light valve and a projecting screen. When the light valve comprises a twisted nematic (TN) type liquid crystal element, a polarizer is further disposed in the optical path. The light emitted from the light source is reflected by the beam splitter and is irradiated on the light valve. The light valve has a dielectric mirror, the light irradiated on the light valve through the beam splitter is reflected by the light valve and the reflected light is transmitted through the beam splitter, enlarged by a lens, and projected on the screen. In this manner, the display picture image of the light valve is displayed as enlarged.

With such a device, in order to improve the resolution, the electron beam of the CRT must be made finer and the scanning speed must be made greater. However, the present technology cannot satisfy these two requirements. At present, only the resolving power of commercial TV has been achieved. Thus, it is impossible to display fine picture images. In order to display static picture images such as documents, a memory is required to refresh the CRT. Since the capacity of this memory corresponds to the resolution, a memory of large capacity is required. For example, when a document of 297 mm×210 mm size is to be displayed with a resolving power of 8 picture elements/1 mm, a memory of about 4 Mbit capacity is required. When the scanning frequency is 60 Hz, which is the same as that of commercial TV, data must be read out from the memory at an ultrahigh speed of 240 MHz (=4 M×60 Hz), which is hard to realize.

An object of the present intention is to provide a liquid crystal display device which is capable of displaying a picture image of high resolution at less cost and with a simple construction.

This object will be accomplished by a liquid crystal display device comprising a memory array including a plurality of cells capable of storing data and of becoming electrically conductive, this conductive condition being determined and sustained based on the contents of the stored data; a data terminal connected to the memory array and supplied with data; an address terminal connected to the memory array for selecting a cell for storing data; a plurality of power source terminals connected to each cell of the memory array; liquid crystal arranged on the memory array; and a transparent electrode arranged on the liquid crystal.

In the above liquid crystal display device, memory cells are arranged in a substrate to control the liquid crystal for each picture element. Therefore, the resolution power of the display device is improved.

Figure 3:
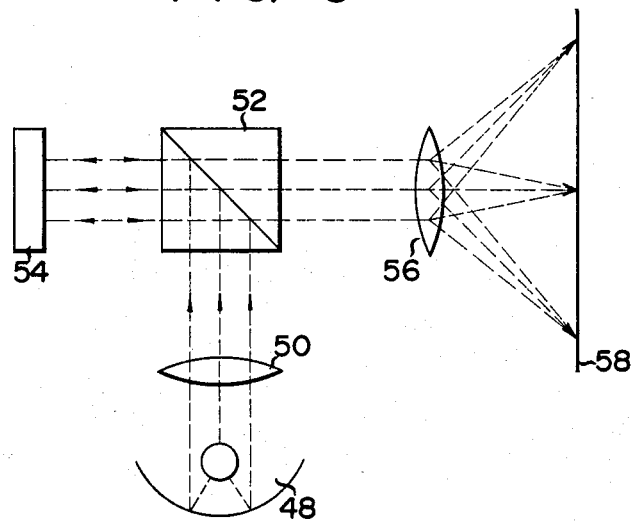
Figure 2:
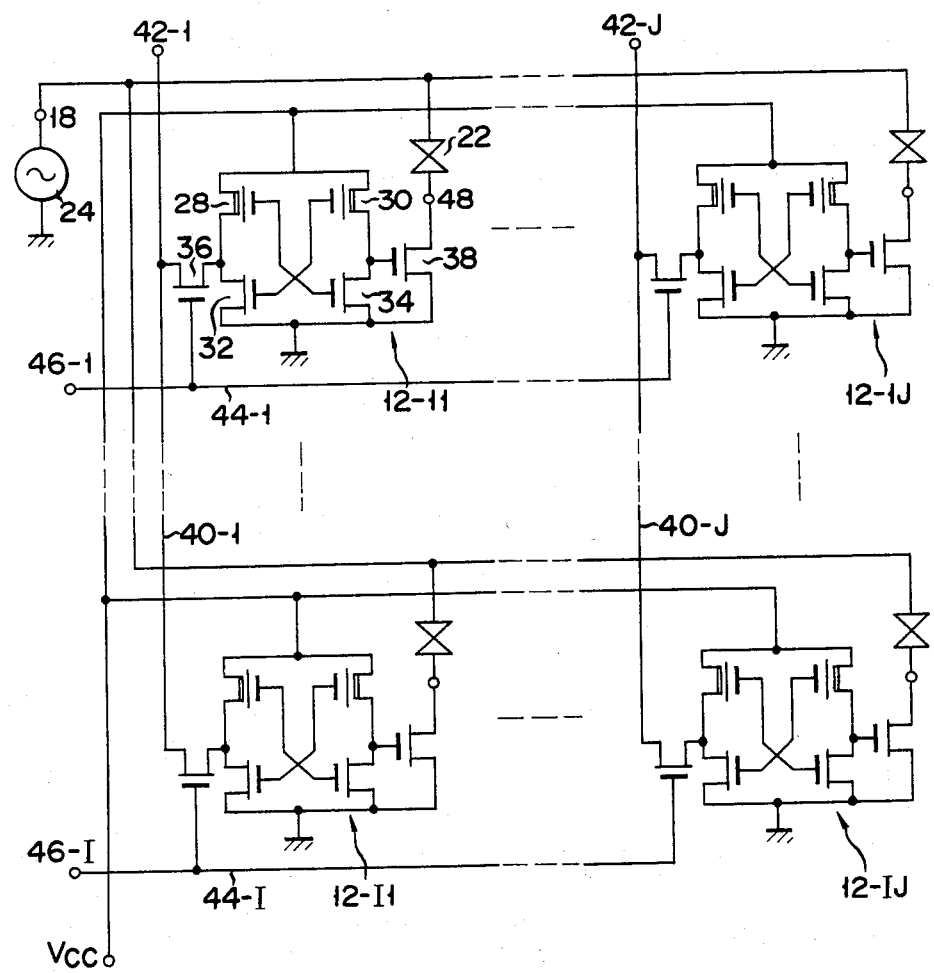
Figure 4:
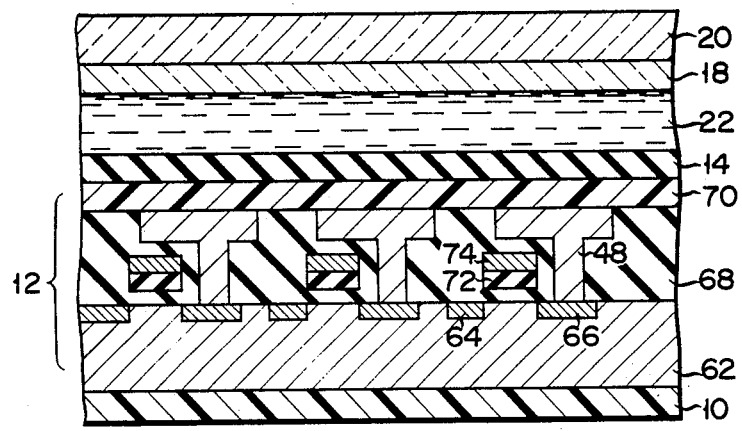
Figure 5:
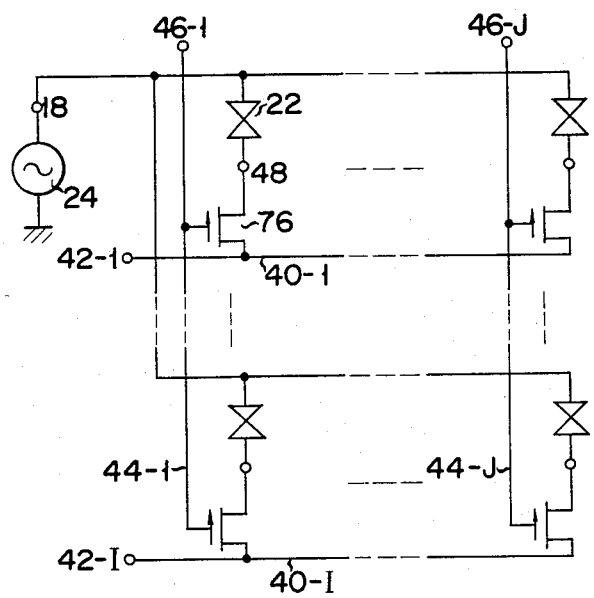
Figure 6:
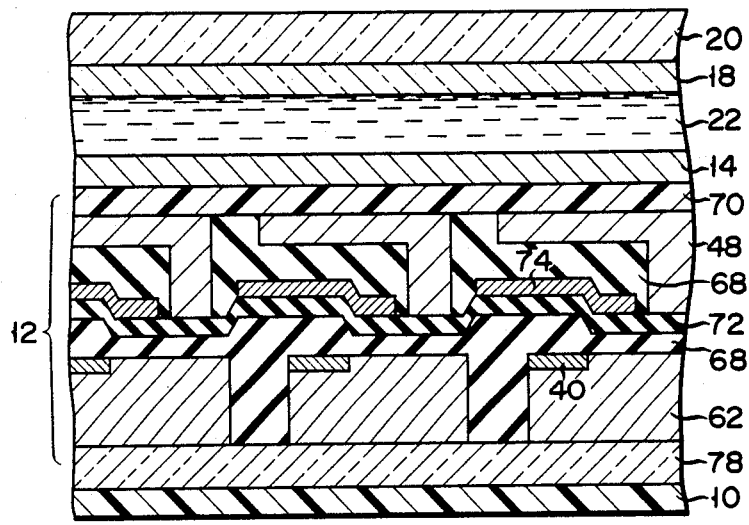
Figure 7:
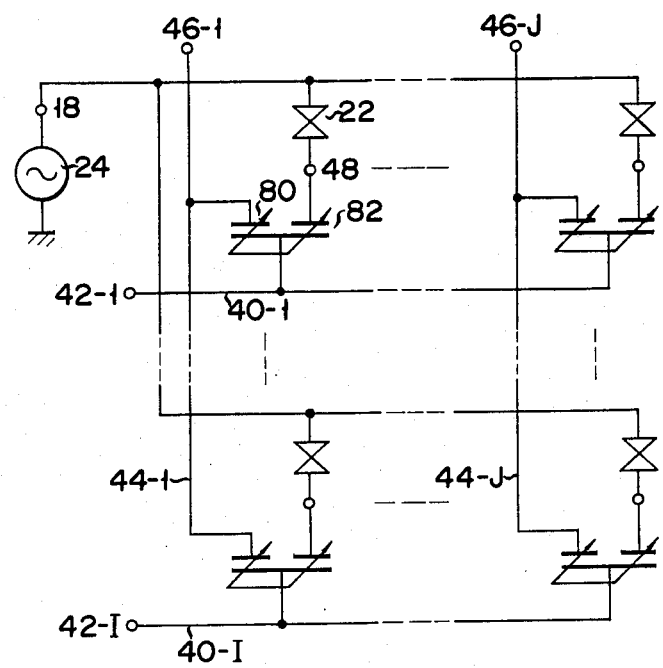
Figure 8:
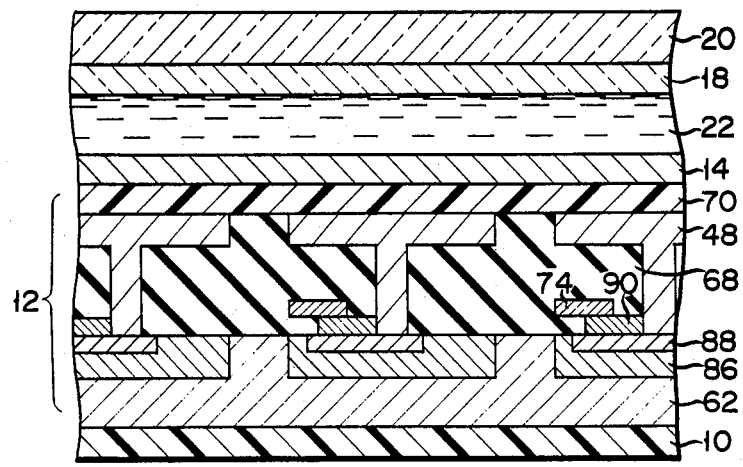
Figure 9:
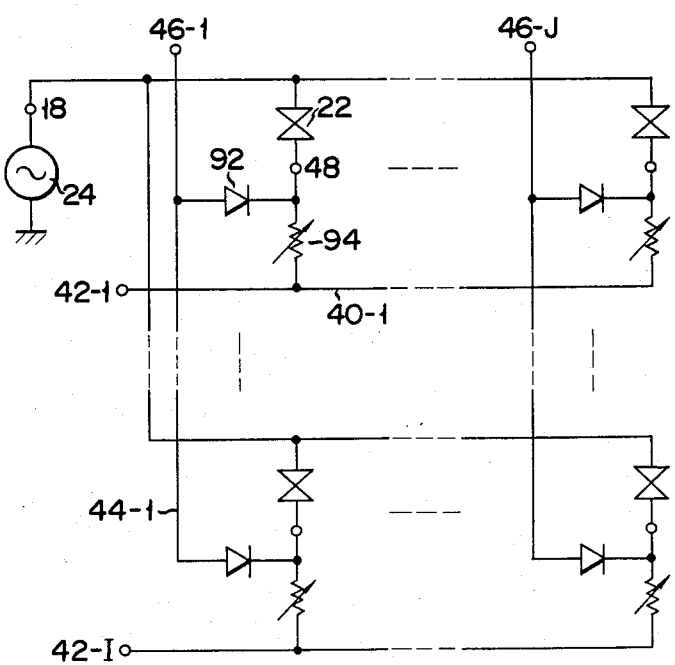
Figure 10:
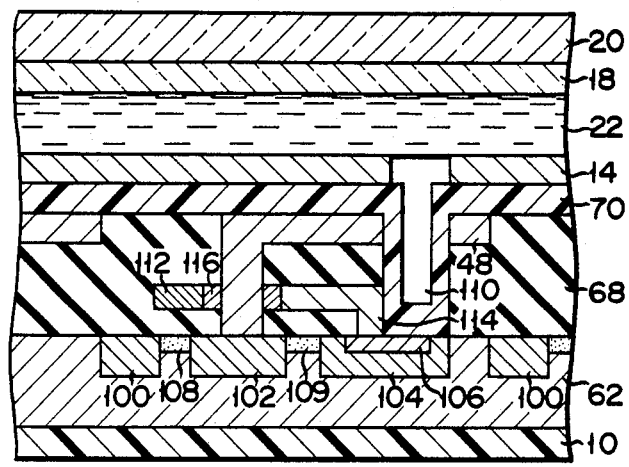
Figure 11:
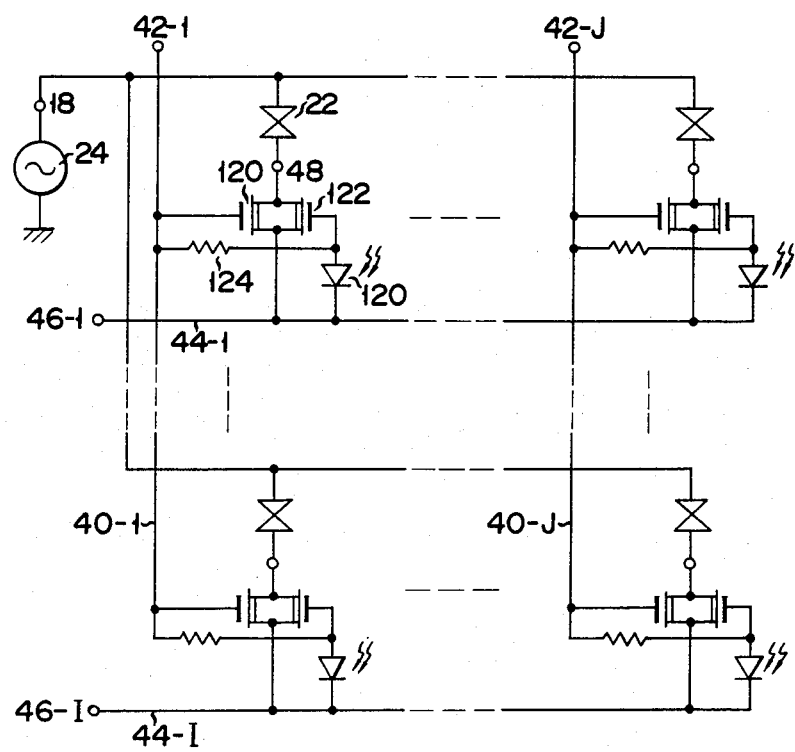
Figure 12:
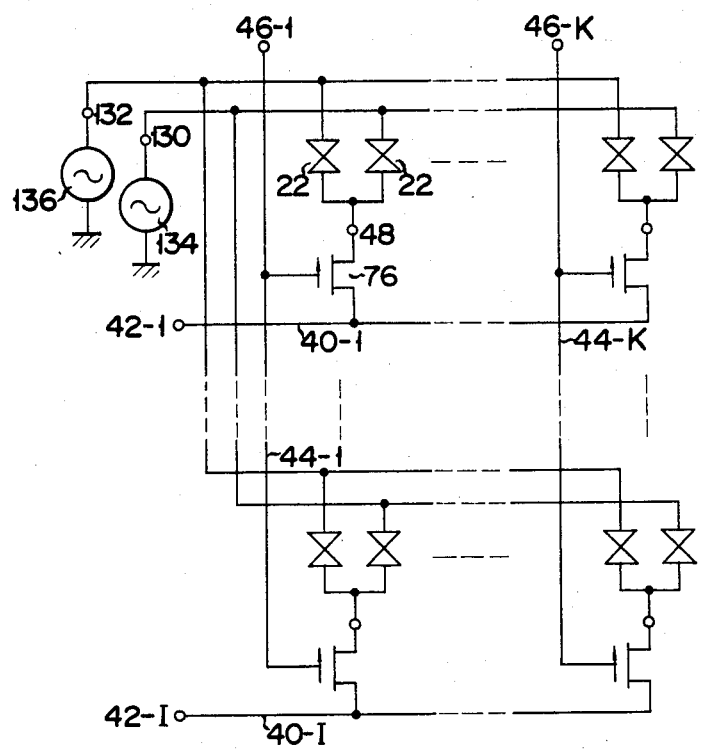
Figure 13:
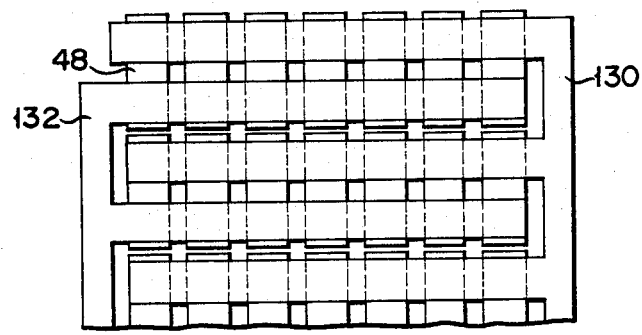
Figure 14:
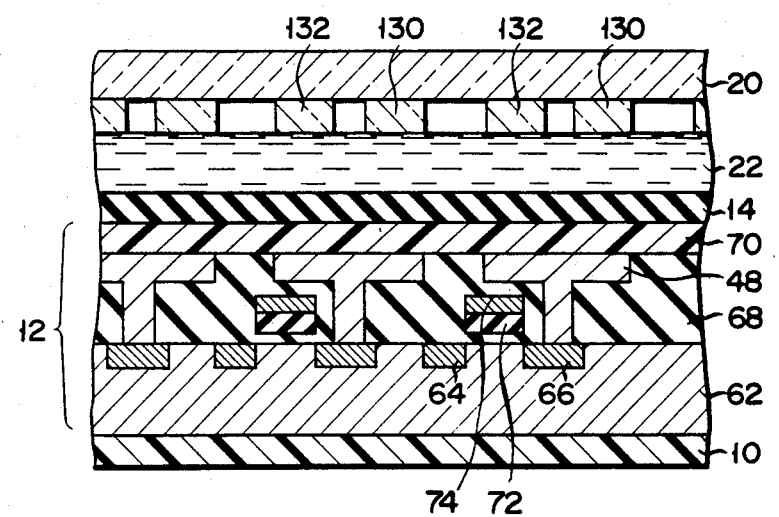
Figure 15:
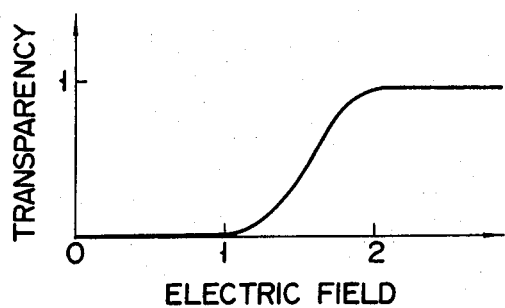
Figure 16:
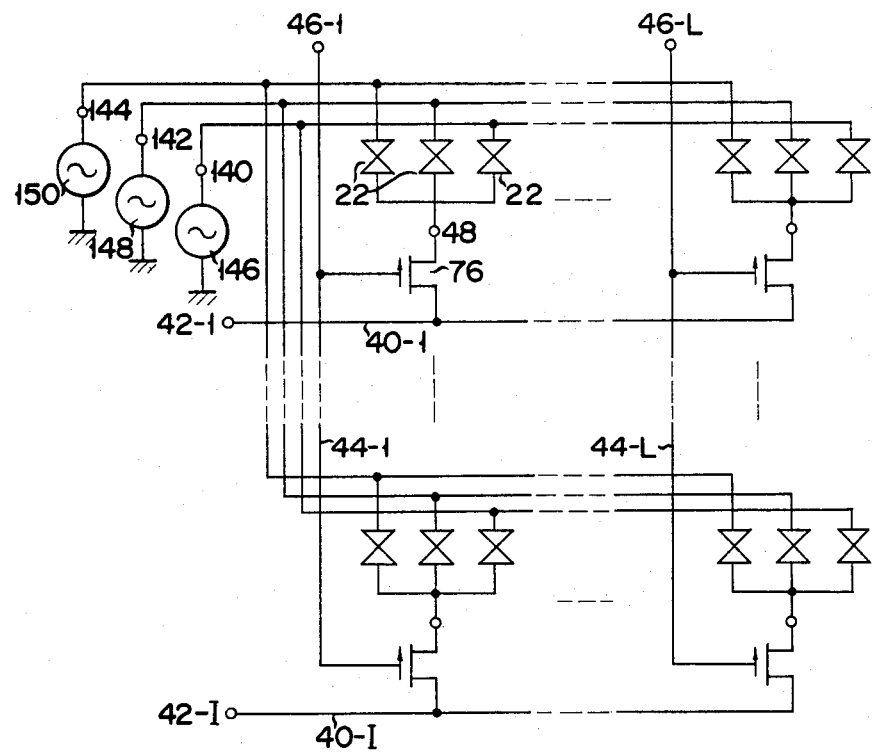
Figure 17:
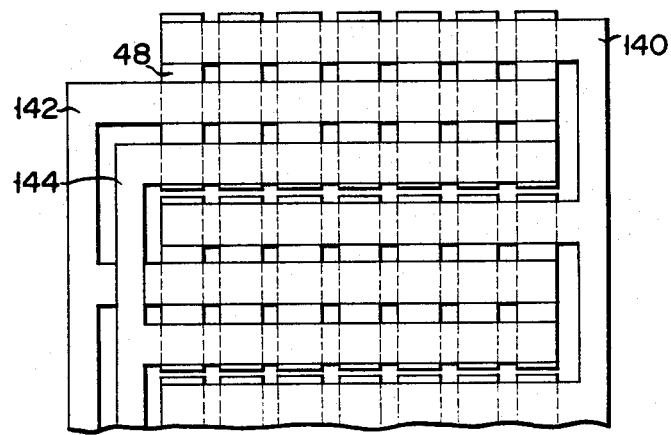
Figure 18:
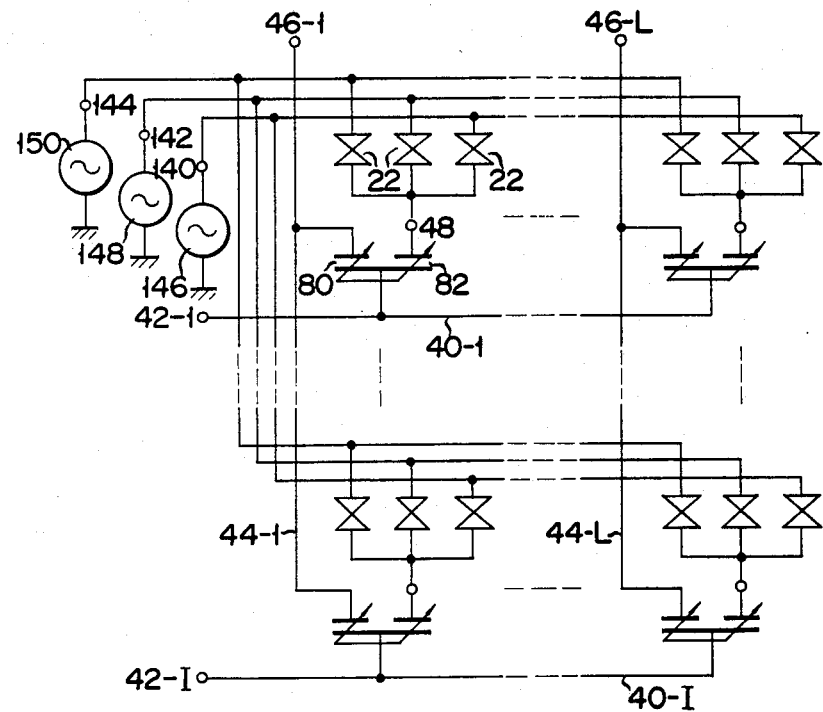
Figure 19:
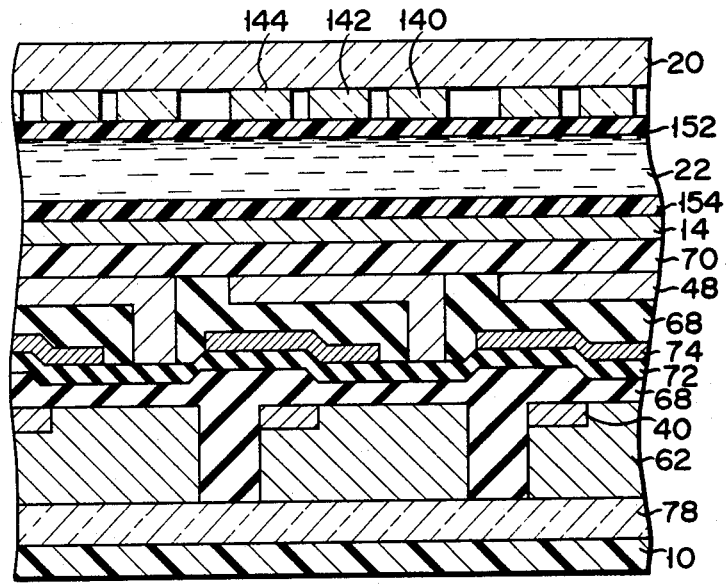
Figure 20:
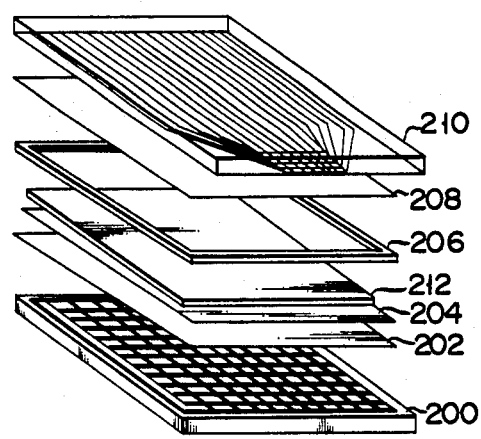
Figure 22:
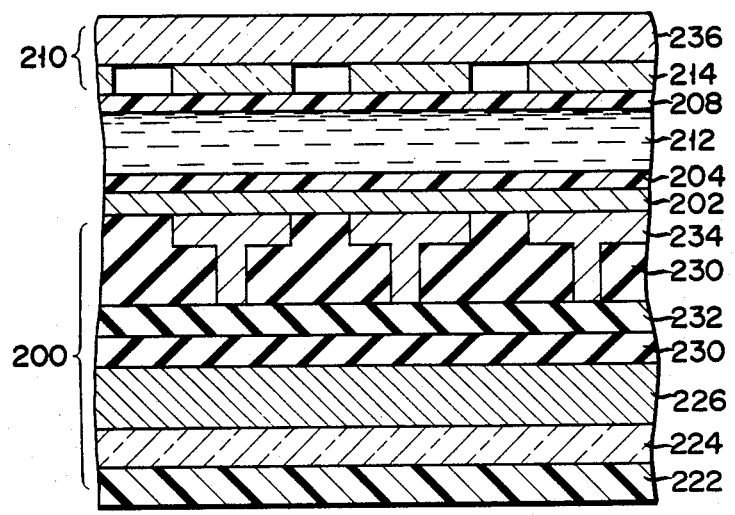
Figure 21:
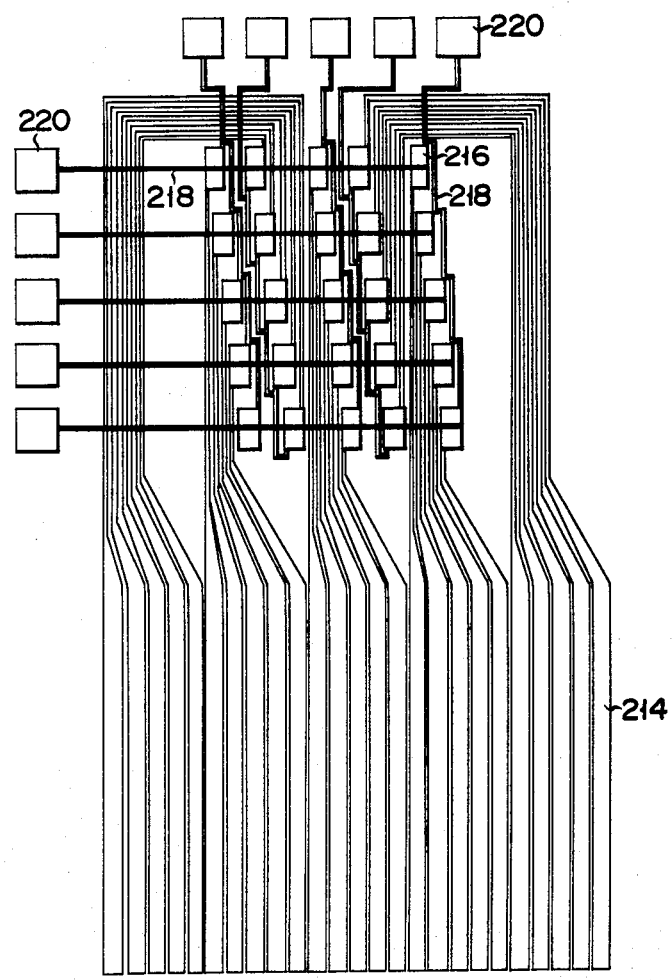
Figure 23:
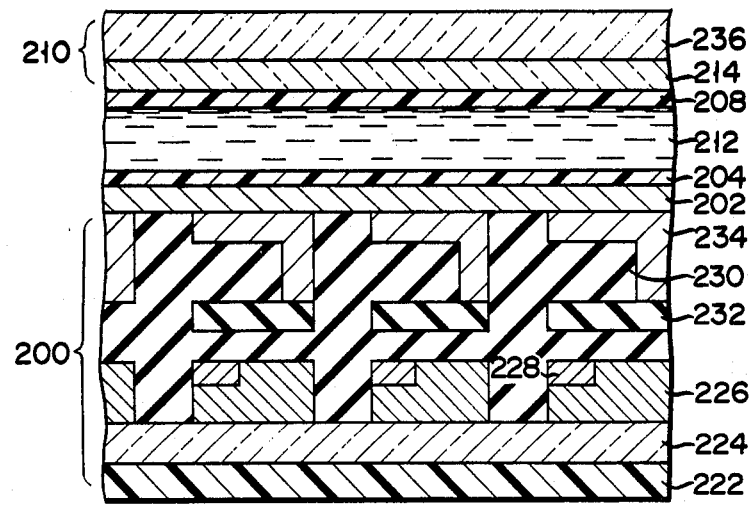
Figure 24:
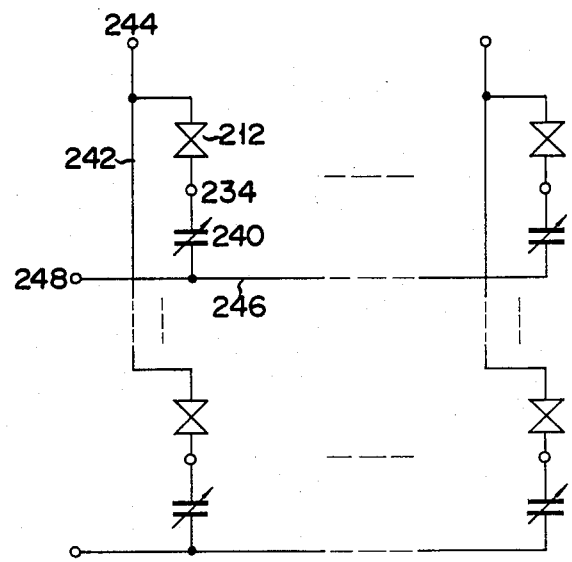
Figure 25:
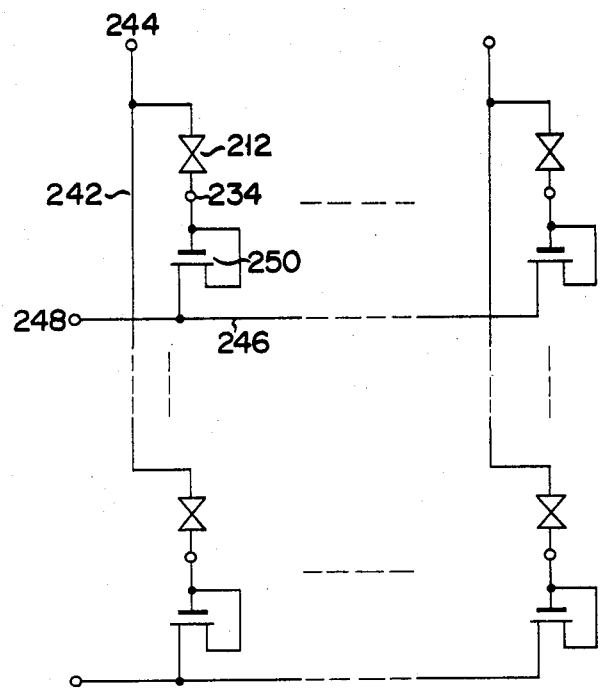
Figure 26:
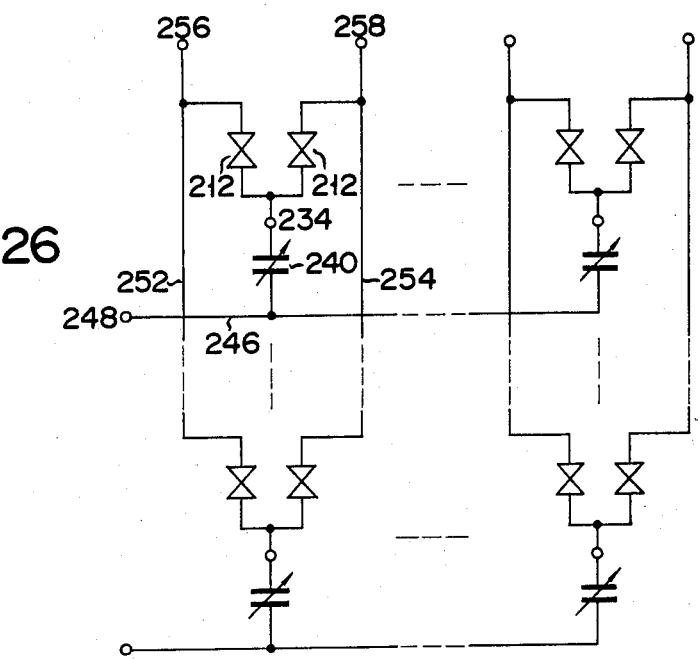

This invention can be more fully understood from the following detailed description when taken in conjunction with the accompanying drawings, in which:

FIG. 1 is a perspective view of a first embodiment of the liquid crystal display device of the present invention;
FIG. 2 is an equivalent circuit diagram of this embodiment;
FIG. 3 is a schematic view of a video projector applying this embodiment;
FIG. 4 is a sectional view of a second embodiment;
FIG. 5 is an equivalent circuit diagram of the second embodiment;
FIG. 6 is a sectional view of a third embodiment;
FIG. 7 is an equivalent circuit diagram of the third embodiment;
FIG. 8 is a sectional view of a fourth embodiment;
FIG. 9 is an equivalent circuit diagram of the fourth embodiment;
FIG. 10 is a sectional view of a fifth embodiment;
FIG. 11 is an equivalent cirucit diagram of the fifth embodiment;
FIG. 12 is an equivalent circuit diagram of a sixth embodiment;
FIG. 13 is a plan view of the sixth embodiment;
FIG. 14 is a sectional view of the sixth embodiment;
FIG. 15 is a graph showing the characteristics of the liquid crystal for explaining the mode of operation of the sixth embodiment;
FIG. 16 is an equivalent circuit diagram of a seventh embodiment;
FIG. 17 is a plan view of the seventh embodiment;
FIG. 18 is an equivalent circuit diagram of an eighth embodiment;
FIG. 19 is a sectional view of the eighth embodiment;
FIG. 20 is a perspective view of a ninth embodiment;
FIG. 21 is a plan view of the selecting line panel of the ninth embodiment;
FIGS. 22 and 23 are sectional views of the ninth embodiment;
FIG. 24 is an equivalent circuit diagram of the ninth embodiment;
FIG. 25 is an equivalent circuit diagram of a tenth embodiment; and
FIG. 26 is an equivalent circuit diagram of an eleventh embodiment.

Embodiments of the liquid crystal display device of the present invention will be described with reference to the accompanying drawings. FIG. 1 is a perspective view illustrating the construction of a first embodiment. On a reinforcing plate 10 are disposed an LSI circuit array 12, a dielectric mirror 14, a seal 16, a transparent electrode 18, and a glass plate 20 in the order named. Liquid crystal 22 is sealed by the seal 16 between the dielectric mirror 14 and the transparent electrode 18. In the drawing, an alignment film to determine the electric field orientation of the liquid crystal is omitted. Although a TN type liquid crystal is preferable for good contrast or for color display, other types of liquid crystals may be used for the liquid crystal 22, e.g. the dynamic scattering (DS) type. However, the following description will be made with reference to the TN type liquid crystal.

In the following description, the expression "transparent", "nontransparent" or "transmittance "0"/"1"" denotes the condition of a liquid crystal observal via a polarizer, when it comes to a liquid crystal in which only the molecular arrangement is changed by the application of an electric field like a TN type liquid crystal. An AC power source 24 is connected to a substrate of the LSI circuit array 12 and the transparent electrode 18.

FIG. 2 is an equivalent circuit diagram of the first embodiment. This LSI circuit array 12 has I×J cells 12-11, ... 12-IJ, and the liquid crystal 22 is controlled for each picture element corresponding to these cells. Since the construction of these cells 12-11, ... 12-IJ is the same, the description will only refer to the cell 12-11, and the description of the other cells will be omitted. N-channel depletion type MOS FETs 28 and 30 and N-channel enhancement type MOS FETs 32 and 34 are so connected to comprise a flip-flop circuit. The following description will be made on the assumption that the MOS FETs are all of n-channel type. Drains of the MOS FETs 28 and 30 are connected to a power source terminal Vcc. Sources of the MOS FETs 32 and 34 are grounded. A source of the MOS FET 28 is connected to a drain of a MOS FET 36, a source of the MOS FET 30 is connected to a gate of a MOS FET 38, and a source of the MOS FET 36 is connected to a data terminal 42-1 through a data line 40-1. A gate of the MOS FET 36 is connected to an address terminal 46-1 through a selection line 44-1. All the cells in one column are connected to the same data line 40, and all the cells in one row are connected to the same selection line 44. A drain of the MOS FET 38 is connected to an aluminum electrode 48. The aluminum electrode 48 is connected to one end of the AC power source 24 through the liquid crystal 22 and the transparent electrode 18. The other end of the AC power source 24 is grounded. Although not shown in the drawings, the data terminal 42 and the address terminal 46 are connected to a shift register, a selection gate and the like.

The mode of operation of this embodiment will now be described. It is assumed that all the MOS FETs in all the cells of the LSI circuit array 12 are nonconductive. It is also assumed that writing of the data is performed for each row. After all the address terminals 46-1, ... 46-I are placed at the ground level, the data terminals 42-1, ... 42-J are set at H or L level according to the picture image of the row to be written. When the address terminal 46 corresponding to the row to be written is set to the writing level exceeding the threshold value, writing of the data for this one row is performed. Since the condition of the flip-flop circuit does not change when the data terminal 42 is at H level, the MOS FET 38 remains nonconductive. For this reason, the AC voltage applied to this liquid crystal 22 is small, the molecular orientation of the liquid crystal does not change, and the liquid crystal is still nontransparent. When the data terminal 42 is at L level, the condition of the flip-flop circuit is inverted, rendering the MOS FET 38 conductive. The AC voltage applied to the liquid crystal 22 is great this time, the molecular orientation of the liquid crystal 22 is changed, and the liquid crystal becomes transparent.

When writing of the data for one row is terminated, the address terminal 46 is placed at the ground level again. After the data terminals 42-1, ... 42-J set for the level corresponding to the picture image of the next row, the address terminal 46 of the next row is set at the writing level. In the cell where the address terminal 46 is set at the ground level, the condition of the flip-flop circuit does not change independently of the level of the data terminal 42. That is, the picture image data is stored. When writing of the data in all the cells is completed, all the data terminals 42-1, ... 42-J and the address terminals 46-1, ... 46-I are set at the ground level, the molecular orientation of the liquid crystal is made stationary according to the written picture image data, and the liquid crystal displays the picture image.

For erasing the stored data, all the data terminals 42-1, ... 42-J are set at H level and all the address terminals 46-1, ... 46-I are set at the writing level. Then, the MOS FETs of all the cells are rendered nonconductive. Similar to the case of writing the data, when the data terminal 42 is set at H level and a desired address terminal 46 alone is set at the writing level, the data of a desired cell alone may be erased.

According to this embodiment, it is possible to arrange memory cells corresponding to each picture element for the liquid crystal element itself so that the liquid crystal may be controlled for each picture element according to the stored data in the memory cells, thereby providing a display device of high resolution. Since these memories comprise LSI circuits, they may be less expensive and simpler in construction. In a general refresh type memory having no storing capability, the data must be read out from the memory every 20 msec or so. However, since the time required for displaying one picture image is as long as about several hundred msec, sufficient writing speed of the data to the memory may be realized by the present LSI techniques. With picture image data memories, random defective memories at a rate of about 1/1,000 to 1/10,000 picture elements are practically negligible, unlike the case of semiconductor memories. It is to be noted that the mode of operation of the embodiment is similar when p-channel type MOS FETs are used.

FIG. 3 shows the optical system of the slide projector applying the liquid crystal display device of this embodiment as a video valve. The light emitted from a light source 48 is incident on a polarizing spectroscope 52 through a lens 50. The polarizing spectroscope 52 has a polarization plane. When the molecular orientation of the liquid crystal does not coincide with the orientation of the polarizing plane, the polarizing spectroscope 52 does not transmit light and is dark. When the molecular orientation of the liquid crystal coincides with the orientation of the polarizing plane, it transmits light and becomes brighter. The output light of the polarizing spectroscope 52 is enlarged by a lens 56 and is displayed on a screen 58. When a DS type liquid crystal is used in place of a TN type liquid crystal, a spectroscope may be used in place of a polarizing spectroscope.

According to the first embodiment of the liquid crystal display device, the data of each cell may be read out through the data line 40 by setting the address terminal 46 at a voltage exceeding the threshold voltage, thereby rendering the MOS FET 36 conductive. Thus, the device may also be used as a memory device for the picture image filing, the data filing, or electronically editing the picture images.

However, the LSI circuit array of this embodiment has elements which number as many as 6 per cell, so that the yield of the production of the LSI circuit is not very high. Furthermore, the stored data of the flip-flop circuit may be erased by a momentary power failure.

A description will now be made of a second embodiment of the liquid crystal display device which has modified LSI circuit arrays for eliminating these defects. In the following description, the same numerals denote the same parts as in the first embodiment, and the description thereof will be omitted. According to the second embodiment, an LSI circuit array 12 comprise nonvolatile memory transistors. The nonvolatile memory transistors may include metal insulator semiconductor (MIS) type memory transistors, floating gate type memory transistors or ferroelectric memory transistors. The MIS type elements may include, for example, metal nitride oxide semiconductor (MNOS) transistors, metal alumina oxide semiconductor (MAOS) transistors and dual dielectric charge storage cells (DDC). The floating gate type transistors may include, for example, floating gate avalanche injection MOS (FAMOS) and stacked gate avalanche injection MOS (SAMOS).

FIG. 4 is a sectional view and FIG. 5 is an equivalent circuit diagram of a liquid crystal display device which uses p-channel MNOS FETs as nonvolatile memory transistors. As shown in FIG. 4, an n-type monocrystalline silicon substrate 62 is laminated over a plastic reinforcing plate 10. P+-type semiconductor regions 64 and 66 are formed for each cell in the surface area of an n-type substrate 62. A silicon oxide layer 68 and a coating layer 70 are formed on the n-type substrate 62 in the order named. Aluminum electrodes 48 are formed on a p+-type semiconductor regions 66, and these aluminum electrodes 48 reach the coating layer 70. Nitride layers 72 are formed through the oxide layer 68, on the n-type substrate 62 between the p+-type semiconductor regions 64 and 66, and polycrystalline silicon layers 74 are formed thereover. The thickness of the nitride layer 72 is, e.g. 400 Å, and the thickness of the oxide layer 68 interposed between the nitride layer 72 and the n-type substrate 62 is, e.g. 20 Å. The p+-type semiconductor regions 64 and 66 comprise a source region and a drain region, respectively, and the polycrystalline silicon layer 74 comprises a gate region. The nitride layer 72 interposed between the oxide layer 68 and the polycrystalline silicon layer 74 is very thin so that exchange of electrons with the n-type substrate 62 is possible by the tunnel effect, thus providing an insulation layer for trapping electrons. The regions from the n-type substrate 62 to the coating layer 70 comprise the LSI circuit array 12. The dielectric mirror 14, the liquid crystal 22, the transparent electrode 18, and the glass plate 20 are formed on the coating layer 70 in the order named.

As shown in FIG. 5, each LSI circuit cell comprises a p-channel MNOS FET 76, a gate of which is connected to an address terminal 46 through a selection line 44, a source of which is connected to a data terminal 42 through a data line 40 and a drain of which is connected to the aluminum electrode 48.

Describing the mode of operation for writing data in the second embodiment, the selection line 44 is arranged in the direction of column so that writing is performed for each column. It is assumed that all the MNOS FETs 76 are conductive, the electrons are trapped in the nitride layer 72 below the gate region, and a channel is formed between the source and drain regions. After setting all the address terminals 46 and the substrate to the ground level, the data terminals 42 are set at the ground level or a suitable negative level (e.g., −20 V) according to the picture image of the column to be written. Then, the address terminal 46 of the column to be written alone is set at a suitable writing level (e.g., −25 V). In a cell where the data terminal 42 is set at the ground level, the electrons trapped in the nitride layer 72 are freed into the substrate 62, rendering the MNOS FET 76 nonconductive. In a cell where the date terminal 42 is set at −20 V, the electrons are not released into the substrate 62, the MNOS FET 76 remains conductive.

In a cell in which the MNOS FET 76 is rendered nonconductive, when the floating capacitance between the drain of the MNOS FET 76 and the substrate 62 is about equal to or less than the capacitance between the aluminum electrode 48 and the transparent electrode 18, the molecular orientation of the liquid crystal 22 does not change. In a cell in which the MNOS FET 76 remains conductive, the AC voltage is kept applied so that the molecular orientation of the liquid crystal 22 changes. Thus, the picture image data is written. After the data for one column is written, its address terminal 46 is set at the ground level, and the address terminal of another column is set at the writing level. In a cell in which the address terminal 46 is set at the ground level, the condition of the electrons in the nitride layer does not change independently of the level of the data terminal 42, so that the written data remains stored. When the data is written in all the cells, all the data terminals 42 and the address terminals 46 are held at the ground level, and the molecular orientation of the liquid crystal 22 is fixed according to the data written.

For erasing the data, after setting all the data terminals 42 and the substrate 62 at the ground level, all the address terminals 46 are set at a suitable negative erasing level (e.g., −25 V). Then, the electrons are trapped in the nitride layers 72 below the gate regions 74 of all the cells, and all the MNOS FETs 76 are rendered conductive.

According to the second embodiment, since only one transistor is required for one cell and the construction is simple, the yield of the LSI circuit array 12 is improved. Furthermore, since nonvolatile memory transistor is used, the data is not erased even in the case of a momentary power failure.

However, since there are at least two p-n junctions in each transistor in the second embodiment, defects attributable to such as a junction short-circuiting tend to occur. This tends to adversely affect the improvement in the yield of the LSI circuit arrays. Although the construction is simple according to the second embodiment, it is impossible to erase the data independently for each cell.

FIG. 6 is a sectional view of a third embodiment, and FIG. 7 is an equivalent circuit diagram of this embodiment. In the third embodiment, each LSI circuit cell comprises two variable capacitors. As shown in FIG. 6, the capacitor comprises a substrate 62 and gate region 74 of the p-type MNOS FET of the second embodiment, excluding a source and drain. The region of the n-type substrate 62 where the channel is formed, that is, a data line 40, is an n+-type semiconductor. A polycrystalline silicon layer 74 constitutes a selection line 44, and a nitride layer 72 interposed between an oxide layer 68 and the polycrystalline silicon layer 74 constitutes an insulation layer for trapping electrons. A sapphire substrate 78 is formed on a reinforcing plate 10, and the n-type substrate 62 corresponding to the respective cell is formed on the sapphire substrate 78.

As shown in FIG. 7, each cell comprises two variable capacitors 80 and 82. One end of the capacitor 80 is connected to one end of the capacitor 82 and to a data terminal 42 through a data line 40. The other end of the capacitor 80 is connected to an address terminal 46 through a selection line 44. The other end of the capacitor 82 is connected to an aluminum electrode 48.

Describing the writing of the data in the LSI circuit cell, it is assumed that the electrons are trapped in the nitride layers 72 of all the cells, and that depletion layers are formed in the n-type substrate 62. After setting all the address terminals 46-1 to 46-J to the ground level, and the data terminals 42-1 to 42-I to the ground level or to a suitable negative level according to the picture image of the column to be written, the address terminal of the desired column alone is set at a suitable negative writing level. In a cell in which the data terminal 42 is set at the ground level, the electrons trapped in the insulation layer 72 are released in the n-type substrate 62. In a capacitor in which the electrons in the nitride layer 72 are released, the depletion layer does not extend to the n-type substrate 62 unless a high electric field is applied to both its ends. Thus, the capacitance of the capacitor 80 between the n-type substrate 62 and the polycrystalline silicon layer 74, i.e., the data line 40 and the selection line 44, becomes great. The capacitance of the capacitor 82 between the data line 40 and the aluminum electrode 48 also becomes great. For this reason, an AC voltage is applied to the liquid crystal 22, and the liquid crystal 22 becomes transparent. On the contrary, in the cell in which the data terminal 42 is set at a suitable negative level, the electrons in the nitride layer 72 are not released and remain trapped. In a capacitor in which the electrons in the nitride layer 72 remain trapped, the depletion layer extends into the n-type substrate 62 unless a high electric field is applied to both ends of the capacitor. Thus, the capacitances of the capacitors 80 and 82 are small. For this reason, an AC voltage is not applied to the liquid crystal 22 so that the liquid crystal is nontransparent.

When writing of the data for one column is completed, the address terminal of this column is set at the ground level, and the address terminal of another column is set at the writing level. In a cell in which the address terminal 46 is set at the ground level, the condition of the electrons in the insulation layer 72 does not change independently of the level of the data terminal 42. For this reason, the written data is retained. When the writing of the data in all the cells is completed, all the address terminals 46 and the data terminals 42 are set at the ground level, and the molecular orientation of the liquid crystal is made stationary according to the written data.

For erasing the written data, after setting all the data terminals 42 at a suitable negative erasing level, all the address terminals 46 are set at the ground level. Then, the electrons are trapped in the insulating layers 72 of all the capacitors. Accordingly, the capacities of all the capacitors become small, and the AC voltage applied to the liquid crystal becomes small. Since there is no p-n junction, unlike in the case of the second embodiment, data of any selected cell alone may be erased by setting the data terminals 42 at a suitable negative level under the condition that all the address terminals 46 are set at a suitable negative level, and by setting a selected address terminal 46 at the ground level.

In the third embodiment, since the aluminum electrode 48 is at a floating DC voltage, static electricity is applied and the trapping and release of the electrons in and from the insulation layer may be obstructed. However, when the resistive coating layer 70 is used, the static electricity charged on the aluminum electrode 48 is naturally discharged.

According to the third embodiment, the stored data will not be erased by a momentary power failure. Furthermore, since there is no p-n junction, the construction is simple and the yield of the LSI circuit array is vastly improved. However, in this embodiment, the data is kept stored based on the capacitance according to the presence or absence of depletion layers in the substrate, i.e., the presence or absence of a minority carriers at the surface of the substrate. Thus, when a large AC electric field is applied to drive the liquid crystal 22 under the condition that the depletion layers are widely extended, holes are induced at the surface of the substrate at every negative half-cycle of the AC electric field. This may vary the capacitance. In order to prevent this, it suffices to use a $p^+$-type data line in place of the $n^+$-type data line 40. That is, it suffices to form the source of the MNOS FET alone and to keep the data stored according to the variations in the capacitance between the gate and the source which depends upon the presence or absence of the channel layer at the surface of the substrate. The capacitance, in this case, is large when the electrons are trapped in the insulation layer, and is small when the electrons are not trapped in the insulation layer, unlike in the former case. Since the writing or erasing of the data may be performed in a manner similar to the former embodiment, the description thereof will be omitted.

FIG. 8 is a sectional view of a fourth embodiment, and FIG. 9 is an equivalent circuit diagram for this embodiment. As shown in FIG. 8, $p^+$-type regions 86 corresponding to each cell are formed at the surface area of an n-type substrate 62, and $n^+$-type regions 88 are formed at the surface areas of the $p^+$-type regions 86. An oxide layer 68 and a coating layer 70 are formed on the n-type substrate 62 in the order named. Aluminum electrodes 48 and chalcogen type amorphous semiconductor layers 90 are formed on the $n^+$-type regions 88. One end of each amorphous layer 90 is in contact with a respective aluminum electrodes 48. Polycrystalline silicon layers 74 are formed on the amorphous layers 90.

In the equivalent circuit shown in FIG. 9, each cell comprises a diode 92 and a variable resistor 94. An anode of the diode 92 consisting of the $p^+$-type region 86 and the $n^+$-type region 88 is connected to an address terminal 46 through a selection line 44. A cathode of the diode 92 is connected to the aluminum electrode 48. One end of a variable resistor 94 consisting of the amorphous layer 90 is connected to the aluminum electrode 48, and the other end thereof is connected to a data terminal 42 through a data line 40. Thus, the polycrystalline silicon layers 74 constitute the data lines 40.

Describing the mode of operation of this embodiment, the chalcogen type amorphous semiconductors undergo phase transition and their resistances change when a suitable pulse voltage or a pulse current is applied. It is assumed that all the variable resistors 94 are under high resistance condition and an AC voltage is not substantially applied to the liquid crystal 22 in the initial state. After setting all the address terminals 46-1 to 46-J at the ground level, the data terminals 42-1 to 42-I are set at the ground level on a suitable positive level VS according to the data to be written. A writing pulse of a suitable shape having a suitable positive level of VW (VW>VS) as the pulse height is supplied to one of the address terminals 46. In a cell in which the data terminal 42 is set at the ground level, the amorphous semiconductor 90 undergoes phase transistion, the variable resistor 94 has a low resistance, and an AC voltage is applied to the liquid crystal 22. In a cell in which the data terminal 42 is set at a suitable positive level VS, the amorphous semiconductor 90 does not undergo phase transition and the variable resistor 94 remains to have a high resistance. After writing into cells of a column, the associated address terminal 46 is set at the ground level, and the writing pulse is supplied to another address terminal. In a cell in which the address terminal 46 is set at the ground level, the amorphous semiconductor 90 does not undergo phase transition independently of the data terminal 42 and the written data remains stored. After writing in all the cells, all the address terminals 46 and the data terminals 42 are set at the ground level, and the molecular orientation of the liquid crystal 22 remains under the condition corresponding to the written data.

For erasing all the data, after setting all the data terminals 42-1 to 42-I to the ground level, an erasing pulse of a suitable shape and of a suitable positive pulse height is supplied to all the address terminals 46-1 to 46-J. Then, the amorphous semiconductor 90 having a low resistance undergoes phase transition so that all the variable resistors 94 have a high resistance. When an erasing pulse is supplied to any selected address terminal 46 after placing the data terminals 42 under grounded or open condition, the data of this cell alone may be erased.

According to this embodiment, the data may be retained in the case of a momentary power failure. Furthermore, as in the case of the first embodiment which utilizes flip-flop circuits, the written data may be read out through the selection line 44 and the data line 40 to be used as the picture image file.

FIG. 10 is a sectional view of a fifth embodiment. A first n+-type region 100, a second n+-type region 102 and a third n+-type region 104 are formed for one cell in the surface area of an n-type substrate 62. A p-type region 106 is formed in the surface area of the third n+-type region 104. Ion-implanted parts 108 and 109 are respectively formed in the surface area of the n-type substrate 62 between the first and second n+-type regions 100 and 102 and between the second and third n+-type regions 102 and 104. An aluminum electrode 48 is formed on the second n+-type region 102. Part of an oxide layer 68 is cut away to form a window 110 to receive light at the upper part of the third n+-type region 104, and a coating layer 70 is in direct contact with the third n+-type region 104. Low-resistance polycrystalline silicon layers 112 and 114 are formed in the oxide layer 68 above the ion- implanted parts 108 and 109, respectively. The low resistance polycrystalline silicon layers 112 and 114 are connected by a high resistance polycrystalline silicon layer 116. Part of the low resistance polycrystalline silicon layer 114 is in contact with the p-type region 106 and the coating layer 70.

A circuit diagram of the equivalent circuit of this embodiment is shown in FIG. 11. Each cell comprises two depletion type n-channel MOS FETs 120 and 122, a high resistance resistor 124 and a photodiode 126. Sources and drains of the MOS FETs 120 and 122 are connected to each other to comprise an OR gate. A gate of the MOS FET 120 is connected to a data terminal 42 through a data line 40. Drains of the MOS FETs 120 and 122 are connected to an aluminum electrode 48, and sources thereof are connected to an address terminal 46 through a selection line 44. A gate of the MOS FET 122 is connected to an anode of the photodiode 126 as well as to the gate of the MOS FET 120 through the resistor 124. A cathode of the photodiode 126 is connected to the address terminal 46 through a selection line 44. The low resistance polycrystalline silicon layer 112, the first n+-type region 100 and the second n+-type region 102 respectively constitute the gate, source and drain of the MOS FET 120. The low resistance polycrystalline silicon layer 114, the third n+-type region 104 and the second n+-type region 102 respectively constitute the gate, source and drain of the MOS FET 122. The third n+-type region 104 and p-type region 106 constitute the photodiode 126, and the high resistance polycrystalline silicon layer 116 constitutes the resistor 124. The MOS FETs 120 and 122 are turned into the depletion type by the ion-implanted layers 108 and 109.

The mode of operation of this embodiment will now be described. It is assumed that although light is incident on the liquid crystal 22 through the glass plate 20 and the transparent electrode 18, the entire liquid crystal is nontransparent and the photodiode 126 and the MOS FETs 120 and 122 are nonconductive. When the photodiode 126 is off, a DC biasing voltage is applied to the MOS FET 120 by the resistor 124. After setting all the address terminals 46-1 to 46-I at the ground level and the data terminals 42-1 to 42-J to suitable negative cutoff levels V1 and V2 (V2=2V1) according to the data to be written, the address terminal 46 for the row to be written is set at the V1 level. In a cell in which the data terminal 42 is at the V1 level, the MOS FETs 120 and 122 are rendered conductive since they are of depletion type, an AC voltage is applied to the liquid crystal 22, and the liquid crystal 22 becomes transparent and transmits light. Thus, the light becomes incident on the photodiode 126 through the window 110, rendering the photodiode 126 conductive. Then, the biasing voltage V1 of the address terminal 46 is applied to the MOS FET 122 through the selection line 44 and the photodiode 126, and the MOS FET 122 remains conductive thereafter.

In a cell in which the data terminal is set at the V2 level, it is assumed that the voltage between the source and gate is not higher than the cutoff voltage, the MOS FET 120 remains nonconductive and the liquid crystal 22 remains nontransparent.

When writing for one row is completed, the address terminal 46 for this row is set at the ground level, and the address terminal of another row is set at the V1 level. In a cell in which the address terminal 46 is set at the ground level, the condition of the MOS FET 120 does not change independently of the level of the data terminal 42 so that the data remains stored.

When writing in all the cells is completed, all the data terminals 42 are set at the V1 or V2 level, and all the address terminals 46 are set at the ground level. Then, the molecular orientation of the liquid crystal 22 is made stationary according to the data written.

For erasing the data, an AC voltage 24 is blocked. Then, the liquid crystal becomes completely nontransparent, rendering all the photodiodes and MOS FETs nonconductive.

According to the fifth embodiment, unlike the case of the first embodiment, light and a logic circuit constitute a flip-flop circuit, so that a smaller number of logic circuit may comprise an LSI circuit array. Although the number of times for writing data is limited in the embodiment wherein the nonvolatile memories such as the MNOS FETs or the amorphous semiconductors are used, such limits are not imposed on this embodiment since it employs flip-flop circuits. Although the description has been made with respect to the case wherein the MOS FET 120 and 122 constituted an OR gate, the MOS FETs may instead comprise an AND gate if the initial condition of the liquid crystal when no electric field is applied is to be suitably set and the MOS FET is of the enhancement type.

In the above embodiments, one memory cell was arranged for one picture element. However, a description will now be made with reference to a case wherein one memory cell is arranged for several picture elements in order to reduce the number of cells to be packaged on the LSI circuit array 12.

FIG. 12 is a circuit diagram of the equivalent circuit of a sixth embodiment. The basic construction of the memory cells is similar to that of the second embodiment shown in FIG. 5, and one cell comprises one p-channel MNOS FET 76. Although the transparent electrode 18 is adhered on the entire surface of the glass plate 20 in the above embodiments, two kinds of comb-shaped transparent electrodes 130 and 132 are combined as seen from the plan view of FIG. 13. The transparent electrodes 130 and 132 are respectively connected to AC power sources 134 and 136. As seen from the plan view of FIG. 13 and the sectional view of FIG. 14, the two transparent electrodes 130 and 132 are arranged above one aluminum electrode 48.

Therefore, in order to realize a resolving power as same as that of above five embodiments it is necessary to arrange only K (K=J/2) memory cells in a row of the LSI circuit array 12.

Describing the mode of operation of this embodiment, for writing the data, it is assumed that all the MNOS FETs 76 are saturated, i.e., they are under the condition that channels are formed such that a large quantity of electrons are trapped in the insulation layers below the gates and there is substantially no voltage drop between the sources and the drains. All the address terminals 46-1 to 46-K and the substrate are set at the ground level, and all the data terminals 42-1 to 42-I are set at one of the ground level; and suitable negative levels V1, V2 and V3 (0>V1>V2>V3; V3 is, for example, −20 V) according to the picture image data of the column to be written. The address terminal 46 of the column to be written alone is set at the negative writing level (e.g., −25 V). In a cell in which the data terminal 42 is set at the ground level, the electrons trapped in the insulation layer are released into the substrate, rendering the MNOS FET 76 nonconductive. In a cell in which the data terminal 42 is set at the V3 level, the electrons trapped in the insulation layer are not released in the substrate and the MNOS FET 76 remains saturated. In a cell in which the data terminal 42 is set at the V2 level, the electrons trapped in the insulation layer are released into the substrate by a small amount, and the MNOS FET 76 remains conductive although not saturated. In a cell in which the data terminal 42 is set at the V1 level, the electrons trapped in the insulation layer are released into the substrate more than in the case wherein the data terminal 42 is set at the V2 level. Then, although the MNOS FET 76 is not rendered nonconductive, it is rendered conductive with considerable on resistance.

The condition of the MNOS FET 76 of each cell is determined according to the level of the data terminal 42. When the data is written for all the cells, the parts between the gates and the sources of the respective MNOS FETs 76 are set at substantially no electric field.

For reading out the data, a suitable AC voltage VR0 is applied to all the data terminals 42-1 to 42-I, and AC voltages VR1 and VR2 (VR0, VR1 and VR2 are synchronized each other and their effective values are different) are applied across the transparent electrodes 130 and 132 to the liquid crystal 22 by the AC power sources 134 and 136, respectively. It is assumed that, as shown in FIG. 15, the liquid crystal 22 is at the level of "0" in transmittance and is nontransparent when the applied AC electric field is at the level of "1" or less and it is at the level of "1" in transmittance and is transparent when the AC electric field is above the level of "2". Since the potential of the aluminum electrode 48 of each cell varies depending upon the conductive condition of the MNOS FET 76 in correspondence with the level of the data terminal 42 as has been already described, the AC voltage applied to the liquid crystal 22 varies even when the same AC voltages are applied to the transparent electrodes 130 and 132. It is now assumed that the effective values of the AC voltages applied to the transparent electrodes 130 and 132 are at the levels of "0" and "2", and the effective level of the AC voltage applied to the data terminal 42 is set to the level of "4". The aluminum electrode 48 assumed to take one of the levels "0", "1", "2" and "4" depending upon the value of the on resistance of the MNOS FET 76. The transmittance of the liquid crystal 22 under these conditions is shown in Table 1. In this table, A in A/B denotes the applied voltage of the liquid crystal 22 and B denotes the transmittance of the liquid crystal 22.

TABLE 1

| Level of Aluminum Electrode 48 | Liquid Crystal 22 between Transparent Electrode 130 and Aluminum Electrode 48 | Liquid Crystal 22 between Transparent Electrode 132 and Aluminum Electrode 48 |
| --- | --- | --- |
| 0 | 0/0 | 2/1 |
| 1 | 1/0 | 1/0 |
| 2 | 2/1 | 0/0 |
| 4 | 4/1 | 2/1 |

When the aluminum electrode 48 is at the level of "0", the voltages between itself and the transparent electrodes 130 and 132 are at the levels of "0" and "2", respectively. Thus, the transmittances of the liquid crystals interposed between the aluminum electrode 48 and the transparent electrodes 130 and 132, respectively, become at the levels of "0" and "1" so that they become nontransparent and transparent, respectively. Similarly, when the aluminum electrode 48 is at the levels of "1", "2", and "4", the transmittances of the liquid crystals become (nontransparent and nontransparent), (transparent and nontransparent), and (transparent and transparent). Since erasing of the data may be performed in the similar manner to that described hereinabove referring to FIG. 5, the description thereof will be omitted.

According to this embodiment, the intermediate values as well as the two values of on and off are stored in the nonvolatile memory transistor, the transparent electrode sandwiching the liquid crystal together with the aluminum electrode is divided into two, and different AC voltages are applied to each of them, so that the liquid crystal for 2 picture elements may be controlled with one aluminum electrode, i.e., one memory cell. For this reason, the number of the cells packaged on the substrate may be reduced to half that of the picture elements, that is, to a desired resolution, the yield of the LSI circuit array may further be improved, and the resolution may be improved.

FIG. 16 is an equivalent circuit diagram of a seventh embodiment. According to this embodiment, the memory cells comprises p-channel MNOS FETs as in the case of the sixth embodiment. However, three transparent electrodes 140, 142, and 144 are disposed for one aluminum electrode 48. AC power sources 146, 148 and 150 are respectively connected to the three transparent electrodes 140, 142, and 144. Only L (L=J/3) memory cells are arranged in a row of the LSI circuit array 12. FIG. 17 shows the arrangement of the aluminum electrode 48 and the transparent electrodes 140, 142 and 144.

Since erasing and writing of the data are performed in a manner similar to that in sixth embodiment, the description thereof will be omitted. For reading out the data, AC voltages of the same phase but of different effective values are applied to all the data terminals 42 and the transparent electrodes 140, 142, and 144. When it is assumed that the level of a voltage applied to the data terminal 42 is "5", the level of the aluminum electrode 48 is set to any of "0", "1", "2", "3", "4" and "5". When the levels of the transparent electrodes 140, 142, and 144 are "1", "2", and "3", the transmittances of the liquid crystal 22 obtained may be as shown in Table 2 prepaired in a similar manner to Table 1.

TABLE 2

| Level of Aluminum Electrode 48 | Liquid Crystal 22 between Transparent Electrode 140 and Aluminum Electrode 48 | Liquid Crystal 22 between Transparent Electrode 142 and Aluminum Electrode 48 | Liquid Crystal 22 between Transparent Electrode 144 and Aluminum Electrode 48 |
| --- | --- | --- | --- |
| 0 | 1/0 | 2/1 | 3/1 |
| 1 | 0/0 | 1/0 | 2/1 |
| 2 | 1/0 | 0/0 | 1/0 |
| 3 | 2/1 | 1/0 | 0/0 |
| 4 | 3/1 | 2/1 | 1/0 |
| 5 | 4/1 | 3/1 | 2/1 |

When the aluminum electrode 48 is at the level of "0", the voltages between itself and the transparent electrodes 140, 142, and 144 are "1", "2" and "3", respectively. Thus, the transmittances of the liquid crystals interposed between the aluminum electrode 48 and the transparent electrodes 140, 142, and 144 become "0", "1", and "1", respectively, so that they are nontransparent, transparent and transparent. Similarly, when the level of the aluminum electrode 48 is at "1", "2", "3", "4", and "5", the liquid crystals between the aluminum electrode and the transparent electrodes become (nontransparent, nontransparent and transparent), (nontransparent, nontransparent and nontransparent), (transparent, nontransparent and nontransparent), (transparent, transparent and nontransparent) and (transparent, transparent and transparent). Although two other conditions of (transparent, nontransparent, and transparent) and (nontransparent, transparent, and nontransparent) may be considered in addition to these six conditions, these cannot be realized in this embodiment. However, since the probability that the adjacent picture elements are under the same conditions is as high as 90% in the display of picture image, the condition of (transparent, nontransparent and transparent) may be practically considered to be the same as the condition of (transparent, transparent and transparent). For the same reason, the condition of (nontransparent, transparent and nontransparent) may be considered to be the same as the condition of (nontransparent, nontransparent and nontransparent).

According to this embodiment, the number of elements to be packaged on the LSI circuit array may be made one third of the number of the picture elements, facilitating a further improvement in the packaging density, yield, and resolution.

Construction including a plurality of transparent electrodes for controlling a plurality of picture elements with one memory cell is not limited to the p-channel MNOS FET cell alone but may be applied to all of the first and the third to the fifth embodiments described hereinabove. For example, as shown in FIG. 7, a case will be described in which variable capacitors comprise cells.

FIG. 18 is an equivalent circuit diagram of an eighth embodiment and FIG. 19 is a sectional view thereof. Three transparent electrodes 140, 142, and 144 are formed on one aluminum electrode 48. The plan view of this embodiment is the same as FIG. 17. In this embodiment, the liquid crystal 22 is interposed between alignment films 152 and 154, as shown in FIG. 19.

Describing the mode of operation for writing the data first, it is assumed that a large quantity of electrons are trapped in the nitride layers 72 of capacitors 80 and 82 of all the cells, the capacitances of the capacitors 80 and 82 are small since the depletion layers extend into the n-type substrate 62 under the absence of the electric fields, the AC impedances of them are great, and the capacitors 80 and 82 are substantially nonconductive. After setting all the address terminals 46-1 to 46-L to the ground level and setting all the data terminals 42-1 to 42-I at a suitable negative level of V1, V2, V3, V4, or V5 (0>V1>V2>V3>V4>V5; V5 is, for example, −20 V) according to the picture image data, the address terminal of the column to be written is set to a suitable negative writing level (e.g., −25 V). In a cell in which the data terminal 42 is set at the ground level, the electrons trapped in the nitride layer 72 are released into the n-type substrate 62. Since the depletion layer formed by the trapped electrons disappears, the capacitances of the capacitors 80 and 82 are great and they are conductive with a small AC impedance. In a cell in which the data terminal 42 is set at −20 V, only a small number of electrons trapped in the nitride layer 72 are released so that the capacitors 80 and 82 remain nonconductive. Similarly, in a cell in which the data terminal 42 is set at the V4, V3, V2, and V1 levels, the AC impedance is smaller for the cell with the data terminal 42 of a higher level (closer to the ground level).

After writing the data into all the cells, a suitable AC voltage (of the same phase as the AC voltage which is applied to the transparent electrodes 140, 142, and 144) is applied to all the data terminals 42-1 to 42-I. In each cell, the liquid crystal 22 between the aluminum electrode 48 and the transparent electrodes 140, 142, and 144 is controlled as in Table 2.

A description will now be made with reference to an embodiment in which the construction of the LSI circuit array 12 is further simplified and the yield of the LSI is improved. FIG. 20 is a perspective view of a ninth embodiment. A dielectric mirror 202, an alignment film 204, a seal 206, an alignment film 208, and a selection line panel 210 are formed in the order named on a data line panel 200 comprising nonvolatile memory elements arranged in a matrix form (e.g., 2,000×2,000) and electrodes connected to the respective elements.

Liquid crystal 212 is interposed between the alignment films 204 and 208, and is sealed by the seal 206.

FIG. 21 is a plan view of the selection panel 210. It is assumed that the data line panel 200 has 5×5 nonvolatile memory cells for the sake of simplicity. Twenty-five transparent electrodes 214 are arranged parallel to each other on a glass base plate (not shown). One end of each transparent electrode 214 is connected to a transistor 216 arranged in a matrix form of 5×5. The transistor 216 is made of amorphous silicon and is formed on a glass base plate. The transistors 216 of each column and row are connected to connecting pads 220 through connecting wires 218.

The structure of this embodiment at its sectional area will be described with reference to FIGS. 22 and 23. FIG. 22 is a sectional view in the direction perpendicular to the transparent electrodes 214, and FIG. 23 is a sectional view in the direction parallel to the transparent electrodes 214. A sapphire substrate 224 is adhered on a reinforcing plate 222. A plurality (2,000) of rodlike n-type semiconductor substrates 226 are arranged on the sapphire substrate 224 in the direction perpendicular to the transparent electrodes 214. N+-type regions 228 are formed in the surface areas of the n-type substrates 226 to extend along the n-type substrates 226, i.e., in the direction perpendicular to the transparent electrodes 214, as shown in FIG. 23. An oxide layer 230 is formed on the sapphire substrate 224 and the n-type substrates 226. Nitride layers 232 extend within each oxide layer 230 on the respective n-type substrates 226 and along the n-type substrates 226. Aluminum electrodes 234 are formed on the respective nitride layers 232. The upper ends of the aluminum electrodes 234 are exposed from the oxide layer 230. These layers constitute the data line panel 200.

The dielectric mirror 202 is formed on the oxide layer 230 and the aluminum electrodes 234; and the alignment film 204, the liquid crystal 212, the alignment film 208, the transparent electrode 214, and the glass plate 236 are formed thereover in the order named.

With such a construction, the aluminum electrodes 234 and the n-type substrates 226 comprise nonvolatile variable capacitors whose capacitances vary depending upon whether or not the electrons are trapped in the nitride layers 232. An equivalent circuit of this embodiment becomes as shown in FIG. 24. Each LSI cell comprises a variable capacitor 240. One end of the liquid crystal 212 is connected to an address terminal 244 through a selection line 242 and the other end is connected to one end of the variable capacitor 240 through the aluminum electrode 234. The other end of the capacitor 240 is connected to a data terminal 248 through a data line 246. The transparent electrode 214 of the selection line panel 210 constitutes a selection line 242, the connection pad 220 constitutes the address terminal 244, and the n+-type region 228 of the data line panel 200 constitutes a data line 246.

The mode of operation of this embodiment will now be described. The liquid crystal 212 interposed between the transparent electrode 214 and the aluminum electrodes 234 functions as a capacitor of substantially constant capacitance. This capacitance is set such that the trapping of the electrons in the nitride layers 232, that is, writing of the picture image data and the display drive of the liquid crystal 212 may be correctly performed. For writing the data, it is assumed that the electrons are trapped in the insulation layers 232 of all the capacitors 240, depletion layers extend into the n-type substrates 226 when no electric field is applied, and the capacitances of the capacitors 240 are at the minimum. A suitable threshold voltage is supplied to a predetermined address terminal 244, i.e., the connecting pad 220 for selecting a particular transparent electrode 214, for rendering all the transistors 216 connected to this pad 220. All the data terminals 248 are set at the ground level or at a suitable negative level Vs according to the data to be written. The address terminal 244 of the column to be written alone is set at the suitable negative writing level. In a cell in which the data terminal 248, i.e., the n+-type region 228 is set at the ground level, the electrons trapped in the nitride layer 232 are released into the n-type substrate 226. Thus, since the depletion layer does not extend into the n-type substrate 226 unless a high electric field is applied to both ends of the capacitor 240, the capacitance of it becomes great. In a cell in which the data terminal 248 is set at the suitable negative level, the electrons remain trapped so that the capacitance of the capacitor 240 remains small. Thus, the picture image data is stored in each cell as the capacitance of the capacitors 240.

After writing in all the cells, an AC voltage for driving the liquid crystal 212 is applied across all the address terminals 244 and the data terminals 248. Since the voltage applied to the liquid crystal 212 varies depending upon the capacitances of the capacitors 240, the liquid crystal 212 is controlled for each picture element.

For erasing the data, all the data terminals 248 are set at a suitable negative erasing voltage and all the address terminals 244 are set at the ground level. Then, the electrons are trapped in the insulation layers 232 in all the capacitors 240 so that the capacitances of all the capacitors 240 are small. For this reason, substantially no AC voltage is applied to the liquid crystal 212. It is also possible to erase the data of any selected cell alone by setting all the address terminals 244 at a suitable negative level Vs and all the data terminals 248 at a suitable negative level Vs and thereafter setting the selected address terminal 244 at the ground level, in a manner opposite to the case of writing of the data.

According to this embodiment, since the transparent electrodes and the selection lines are common, the LSI circuit cells with a still simpler construction are realized, improving the yield of the LSI circuit cells. For this purpose, it suffices to arrange a plurality of parallel n-type semiconductor substrates on the sapphire substrate and to arrange a plurality of parallel transparent electrodes on the liquid crystal in a direction perpendicular to the semiconductor substrates. Even if 2,000 transparent electrodes are included, only wires of about $\sqrt{2,000} \times 2 \approx 90$ are required for connection with external circuits. Since the data is stored as the variations in the capacitance, the data can be retained in the case of a momentary power failure.

Although the selection panel 210 comprises an amorphous silicon transistor or the like on a glass substrate, it may alternatively be of the SOS structure which is formed on a sapphire substrate. Although the SOS structure is more expensive, it allows high speed operation. With the amorpous silicon transistor, high speed operation may also be enabled by monocrystallizing utilizing laser annealing. Although the transistor array on the selection line panel 210 was arranged in two-dimensional manner, the number of connecting wires with the external circuits may further be reduced if decoders are formed, neglecting the increase in the number of elements.

Although the memory cell comprised variable capacitors in the above description, the present invention is not limited to this. For example, as shown in FIG. 25, an embodiment is also possible in which a nonvolatile memory transistors 250 are used. A source of the transistor 250 is connected to a data line 246, and a gate and drain thereof are connected to an aluminum electrode 234. The sectional views of this embodiment will be the same as those shown in FIGS. 22 and 23 except that the transistor 250 is formed in the n-type substrate 226. Writing and erasing of the data is performed depending upon whether or not the electrons are trapped in the insulation layers below the gates of the transistors 250 in this embodiment as in the former embodiments. However, the difference is that the drive control of the liquid crystal 212 is performed according to the conductive or nonconductive condition of the transistors 250.

Although one memory cell controls one picture element in the above two embodiments, one memory cell may be arranged for several picture elements as in the embodiments as shown in FIGS. 12 to 19. The packaging density of the LSI circuit and the yield are improved. As an example, FIG. 26 shows a circuit diagram of the equivalent circuit of the embodiment where one cell comprising a variable capacitor 240 controls two picture elements. Since the plan view of this embodiment is the same as FIG. 13, it will be omitted. An aluminum electrode 234 is connected to selection lines (transparent electrodes) 252 and 254 through a liquid crystal 212, and the selection lines 252 and 254 are connected to address terminals 256 and 258, respectively.

Since the mode of operation of this embodiment is similar to the mode of operation of the embodiment described with reference to FIGS. 12 to 15, the description of it will be omitted. Although the data was stored as the on resistance of the MNOS FET in the former embodiment, the data is stored as the capacitance of the capacitor in this embodiment.

The present invention is not limited to the particular embodiments described above and various other modifications and variations can be made without departing the spirit and scope of the present invention. For example, although the liquid crystal display device was used as the light valve, the dielectric mirror may be eliminated and the device may be used as the reflecting type display device as in the case of the liquid crystal TV. Furthermore, the nonvolatile memories may comprise the MNOS MoOSs (metal nitride molybdenum oxide semiconductors). By suitably selecting the biasing voltage, it is possible to obtain intermediate display modes in addition to the two modes of transparency and nontransparency. It is also possible to use a p-channel MOS FET in place of an n-channel MNOS FET, to use an n-channel nonvolatile memory in place of a p-channel nonvolatile memory, or to use a silicon substrate instead of a sapphire substrate in an SOS structure, further to form each cell on an amorphous silicon substrate. The gist of the present invention is that the liquid crystal display device itself includes a static type memory which has the function to store data and does not require an external memory circuit for this purpose. Although erasing of the stored data is performed at a high speed, it may otherwise be performed with ultraviolet rays as in the case of the ultraviolet ray erasable type programmable ROM if erasing at a high speed is not required.

What we claim is:

1. A liquid crystal display device comprising:
   a memory array including a plurality of cells having means for storing data without any external memory for refreshing and for becoming electrically conductive, such that this conductive condition is determined and sustained based on the contents of the stored data;
   a data terminal connected to said cells of said memory array and supplied with data to be stored;
   an address terminal connected to said cells of said memory array for selecting a cell;
   a power source terminal connected to each cell of said memory array;
   liquid crystal arranged on the surface of said memory array; and
   a transparent electrode arranged on the liquid crystal, holding said liquid crystal with said memory array and applying an electric field to said liquid crystal with said power source terminal through said cells.

2. A liquid crystal display device according to claim 1, further comprising a dielectric mirror interposed between said memory array and said liquid crystal.

3. A liquid crystal display device according to claim 1 or 2, in which said cell comprises a flip-flop circuit.

4. A liquid crystal display device according to claim 1 or 2, in which said cell comprises a nonvolatile memory transistor having an insulation layer for trapping electrons and a transistor controlled by the electrons in said insulation layer.

5. A liquid crystal display device according to claim 1 or 2, in which said cell comprises an insulation layer for trapping electrons and a capacitor whose capacitance changes by the electrons in said insulation layer.

6. A liquid crystal display device according to claim 1 or 2, in which said cell comprises an amorphous semiconductor whose resistance changes by phase transition.

7. A liquid crystal display device according to claim 1 or 2, in which said cell comprises a photosensor for sensing the light transmitted through said liquid crystal and a flip-flop circuit controlled by an output signal of said photosensor.

8. A liquid crystal display device comprising:
   a memory array including a plurality of cells having means for storing data without external memory for refreshing and for becoming electrically conductive, such that this conductive condition is determined and sustained based on the contents of the stored data;
   a data terminal connected to said cells of said memory array and supplied with data to be stored;
   an address terminal connected to said cells of said memory array for selecting a cell;
   power source terminals connected to each cell of said memory array;
   liquid crystal arranged on the surface of said memory array; and
   a plurality of transparent electrodes arranged at the surface of said liquid crystal on each said cell of said memory array, which hold said liquid crystal with said cell and applies a plurality of electric fields to said liquid crystal with said power source terminals through said cells.

9. A liquid crystal display device according to claim 8, further comprising a dielectric mirror interposed between said memory array and said liquid crystal.

10. A liquid crystal display device according to claim 8 or 9, in which said cell comprises a nonvolatile memory transistor having an insulation layer for trapping electrons and a transistor controlled by the electrons in said insulation layer.

11. A liquid crystal display device according to claim 8 or 9, in which said cell comprises an insulation layer for trapping electrons and a capacitor whose capacitance changes by the electrons in said insulation layer.

12. A liquid crystal display device according to claim 8 or 9, in which said memory array is formed on an amorphous silicon or monocrystalline silicon substrate.

13. A liquid crystal display device comprising:
a selection line panel in which a plurality of linear transparent electrodes are arranged parallel to each other on a transparent substrate;
liquid crystal arranged at the surface of said selection line panel at the side of said transparent electrodes;
a data line panel including a plurality of memory cells having means for storing data without any external memory for refreshing and for becoming electrically conductive, such that this conductive condition is determined and sustained based on the contents of the stored data, and a plurality of data lines connected to said cells and supplied with data to be stored, said data lines being arranged in a direction perpendicular to said transparent electrodes; and
a power source terminal connected to said data line panel and applying an electric field to said liquid crystal through said cells in cooperation with said transparent electrodes.

14. A liquid crystal display device according to claim 13, further comprising a dielectric mirror interposed between said data line panel and said liquid crystal.

15. A liquid crystal display device according to claim 13 or 14, in which said selection line panel is formed on a glass substrate, and said transparent electrodes are connected to switching elements made of amorphous silicon or monocrystalline silicon.

16. A liquid crystal display device according to claim 13 or 14, in which said selection line is formed on a sapphire substrate, and said transparent electrodes are connected to switching elements made of amorphous silicon or monocrystalline silicon.

17. A liquid crystal display device according to claim 13 or 14, in which said cell comprises a nonvolatile memory transistor having an insulation layer for trapping electrons and a transistor controlled by the electrons in said insulation layer.

18. A liquid crystal display device according to claim 13 or 14, in which said cell comprises an insulation layer for trapping electrons and a capacitor whose capacitance is controlled by the electrons in said insulation layer.

19. A liquid crystal display device according to claim 13 or 14, in which a plurality of said transparent electrodes are arranged for one cell for applying a plurality of electric fields on said liquid crystal on said one cell.

* * * * *